United States Patent

[11] 3,621,012

| [72] | Inventors | Paul S. Starcher<br>Charleston;<br>David Trecker, South Charleston, W. Va.;<br>James E. McKeon, Thornwood, N.Y. |
|---|---|---|
| [21] | Appl. No. | 851,082 |
| [22] | Filed | Aug. 18, 1969 |
| [45] | Patented | Nov. 16, 1971 |
| [73] | Assignee | Union Carbide Corporation<br>New York, N.Y. |

[54] OXIDATION OF LACTAMS TO CYCLIC IMIDES
11 Claims, No Drawings

[52] U.S. Cl. .................................................. 260/239.3 R,
260/281, 260/326.5 FM, 260/239 A,
260/326.16, 260/326, 260/268 DK
[51] Int. Cl. ........................................................ C07d 41/06

[50] Field of Search .............................................. 260/239.3,
294.7 F, 326.5 F, 281

[56] References Cited
UNITED STATES PATENTS
3,336,299  8/1967  Fenton ........................  260/239.3

*Primary Examiner*—Henry R. Jiles
*Assistant Examiner*—Robert T. Bond
*Attorneys*—Paul A. Rose and Louis C. Smith ABSTRACT: Cyclic imides are produced by contacting lactams with a hydroperoxide in the presence of a metal salt catalyst. The starting material lactam must have an unsubstituted methylene position adjacent to the ring nitrogen in order for imidization to occur.

OXIDATION OF LACTAMS TO CYCLIC IMIDES

This invention relates to the liquid phase production of cyclic imides from their corresponding lactams. The invention particularly relates to the production of adipimide from ε-caprolactam.

Earlier attempts to produce cyclic imides relied heavily upon ring closure method, using a half-acid, half-amide intermediate. This approach works quite well for five- six-membered ring compounds, but when efforts were made to produce higher series members of seven or more, the resulting product appeared in a low yield. Direct oxidation of five- and six-membered lactams has been undertaken in the past, but not on the higher members of the series.

Adipamide has been pyrolyzed at 250° C. to give adipimide in a 1.2 percent yield and ammonia as shown in the report of H. K. Hall, Jr. and A. K. Schneider in *J.A. Chem. Soc.* 80, 6409 (1958). Work with δ-cyanovaleric acid gave trace yields of adipimide when the acid was heated at 230° C. for the reaction was characterized as highly reversible. This, in turn, led to the use of the imoniumhydrin of cyanovaleryl chloride by the same worker to give adipimide in a 12 percent yield after pyrolysis at 180° C. followed by a water treatment. These investigations are reported in *Zhur. Obshchei Khim.*, 25, 2127 (1955) and *Zhur. Obshchei Khim.*, 30, 596 (1960). The Beckmann rearrangement of 1,2-cyclohexanedione dioxime rendered adipimide in a 14 percent yield, but this process again requires two steps, and is discussed in *Bull. Chem. Soc. Japan*, 34, 1812 (1961).

Cyclic imides were produced from the corresponding lactam by persulfate oxidation, but this reaction gave generally low yields, and when adipimide production was attempted from ε-caprolactam, only polymer was produced; see H. L. Needles and R. E. Whitfield, *J. Org Chem.*, 31, 341 (1966).

The literature also contains various oxidation reactions using various hydroperoxides, either alone or in combination with various metal catalysts to produce a host of materials. Tertbutyl hydroperoxide, acting by itself, is known to convert cyclic ketones to lactones and is described more fully by D. C. Dittmer et al. in *Chem. Ind.* (London), 152, (1964). Cycloaliphatic amines have been turned into the corresponding oximes by using tert-butyl hydroperoxide and a vanadium metal catalyst which is the subject matter of Belgian Pat. No. 668,811. An iron metal catalyst and tert-butyl hydroperoxide system has been used to convert acrolein to methacrylic acid as set forth in Netherlands Pat. Application 64-12,904.

Imides and especially cyclic imides have a variety of uses. Adipimide has been shown to be an effective activator in the polymerization of 2-pyrrolidone and is claimed as such in U.S. Pat. No. 3,033,831. Succinimide is a valuable intermediate in the production of N-vinyl succinimide, which has been polymerized to make plastic films and dye receptors. The presence of the imide grouping on these compounds renders them particularly useful as dye receptors.

It has now been found that cyclic imides can be formed when a lactam having at least one unsubstituted methylene group next to the ring nitrogen is reacted in the liquid phase with a hydroperoxide in the presence of a metal ion catalyst, particularly selected from the group 4A, 5A, 6A, 7A, 8 and 1B metals with Group 7A and 8 metals preferred. This process is noted for its uniform application, high selectivity and mild reaction conditions. The reaction also differs from many earlier processes in that the desired product results from a one-step process, which would suppress the formation of undesirable intermediates.

The general reaction is as follows:

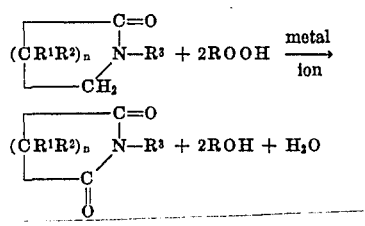

Where $R^1$, $R^2$, and $R^3$ may be alike or different and are selected from the group consisting of hydrogen, alkyl having from one to 10 carbon atoms, aryl having from six to 18 carbons, aralkyl having from seven to 14 carbons, alkaryl having from seven to 14 carbons and heterocyclyl with two to nine carbons; R is selected from the group consisting of one to 14 carbon alkyl, six to 18 carbon aryl, seven to 14 carbon aralkyl, seven to 14 carbon alkaryl, two to nine carbon heterocyclyl, one to 10 carbon alkanoyl, six to 18 carbon aroyl, seven to 14 carbon aralkanoyl and seven to 14 carbon alkaroyl; and $n$ is an integer from 1 to 13.

Various lactams which may be used in the process of the instant invention and their corresponding cyclic imides are listed below:

| Lactam | Corresponding Cyclic Imide |
| --- | --- |
| β-Propriolactam | Malonimide |
| 2-Pyrrolidone | Succinimide |
| N-Methyl-2-pyrrolidone | N-Methyl succinimide |
| 2-Piperidone | Glutarimide |
| ε-Caprolactam | Adipimide |
| N-Phenyl-2-pyrrolidone | N-Phenyl glutarimide |
| N-2-Furanyl-2-piperidone | N-2-Furanyl glutarimide |
| N-p-Tolyl-ε-caprolactam | N-p-Tolyl adipimide |
| N-Benzyl-3-phenyl-2-piperidone | N-Benzyl-3-phenyl glutarimide |
| Lactam of 7-amino-heptanoic acid | Heptanimide |
| Lactam of 8-amino-octanoic acid | Octanimide |
| Lactam of 9-amino-nonanoic acid | Nonanimide |
| Lactam of 10-amino decanoic acid | Decanimide |
| Lactam of 15-aminopentadecanoic acid | Pentadecanimide |
| 3-Methyl-2-pyrrolidone | 3-Methyl succinimide |
| 4-Phenyl-ε-caprolactam | 5-Phenyl adipimide |
| Phthalimidine | Phthalimide |
| 2,2-Dimethyl-5-valerolactam | 3,3-Dimethyl glutarimide |

Additional lactams having more complexity than the compounds disclosed above can also be oxidized by the instant process. For example, unsaturated lactams, dilactams, lactams with an extra hetereo atom in the ring, lactams bearing additional functional groups, polymers of N-vinyl lactams, etc., may be converted to their corresponding imides if they bear an unsubstituted methylene adjacent to the ring nitrogen.

Typical examples of such lactams and their corresponding cyclic imides are:

| Lactam | Corresponding Cyclic Imide |
| --- | --- |
| Piperazine-2,5-dione | Piperazone-2,3,5-trione |
|  | Piperazine-2,3,5,6-tetrone |
| 4-Oxa-2-piperidone | 4-Oxaglutarimide |
| N,N-Dimethyl piperazine-2,5-dione | N,N-Dimethyl piperazine-2,3,5-trione |
|  | N,N-Dimethyl piperazine-2,3,5,6-tetrone |
| Poly(N-vinyl pyrrolidone) | Segments of poly(N-vinyl succinimide) |
| Lactam of 5-amino-2-pentenoic acid | 3,4-Dehydroglutarimide |
| 3,4-Epoxy-ε-caprolactam | 4,5-Epoxyadipimide |
| 5-Keto-2-piperidone | 3-Ketoglutarimide |
| 3,3,4,4-Tetrachloro-ε-caprolactam | 4,4,5,5-Tetrachloroadipimide |

Representative examples of the hydroperoxides which may be used are ethyl hydroperoxide, n-propyl hydroperoxide, t-butyl hydroperoxide, t-amyl hydroperoxide, cumene hydroperoxide, benzyl hydroperoxide, 1-tetralin hydroperoxide, p-tolyl hydroperoxide, and the like. Particularly useful are the tertiary hydroperoxides, such as t-butyl hydroperoxide, t-amyl hydroperoxide and cumene hydroperoxide.

Metal ion catalysts which may be used to bring about the oxidation are taken from the Group 4A, 5A, 6A, 7A, 8 and 1B metals with Group 7A and 8 metals preferred. Several oxidation states of the same metal may be employed; for example, both manganese (II) and manganese (III) were found to be effective catalysts in the t-butyl hydroperoxide oxidation of ε-caprolactam. Highly effective counterions for use with the metals are simple acid salts, such as stearates, caproates, and acetates. Bidentate ligands are also useful such as acetylacetate, acetylacetonate, and ortho-phenanthroline.

Examples of effective catalysts include vanadyl acetylacetonate, vanadic trioctanoate, chromium triacetate, chromoyl caproate, manganic acetylacetonate, manganous acetylacetonate, manganic stearate, ferrous stannoate, ferric acetylacetonate, cobalt octanoate, cobalt naphthenate, cuprous acetate, cupric acetate, and the like. Especially preferred catalysts are the manganese and cobalt salts; manganese (III) acetylacetonate has proven to be highly effective.

Working examples have indicated that the best combination of oxidant and catalyst is the pairing of t-butyl hydroperoxide and manganic acetylacetonate.

The general reaction parameters require no particular way in which to add the ingredients; they may be added simultaneously or one may be added to a solution of the other two. However, on a production scale, it is preferable to add one or two of the ingredients in increments. The mole ratio of peroxide/lactam may range from 5 to 0.01; the preferred range is a ratio between 2 and 0.05, and the most preferred range is a ratio between 1 and 0.1. An inert solvent may also be employed although it is not necessary. It is best to use as a solvent, if one is desired, the alcohol corresponding to the hydroperoxide. For example, if t-butyl hydroperoxide is used as the oxidant, then t-butyl alcohol will be used as the solvent. Many commercial-grade hydroperoxides are not completely solvent-free and there is no danger in using such a component for it will operate as a solvent base. The reaction temperature may range between -30° C. and 120° C. as long as the reaction solution remains fluid. The preferred temperature range is from 0° C. to 100° C. with the most preferred temperatures ranging from 20° to 60° C. An artificial atmosphere may be employed if desired, either an enriched oxygen atmosphere or an inert atmosphere such as nitrogen, argon or helium. An ordinary reaction in air can also be used.

The amount of metal ion catalyst which is added to the reaction mixture is not narrowly critical and need only be added in amounts effective to initiate the reaction. An additional advantage of the instant process is that large amounts of catalyst are not required. The preferred range of catalyst is from about 0.1 mole per cent or lower to about 1.0 mole per cent and higher, based on the hydroperoxide employed. Any amount can be used as long as it is catalytically effective. There is no limit to the upper range other than economic considerations.

The following examples show the practice of the invention.

EXAMPLE 1

A solution of ε-caprolactam (11.3 g., 0.1 mole), 81.8 percent by weight cumene hydroperoxide (15.2 g., $8.2 \times 10^{-2}$ mole) and manganic acetylacetonate (0.1 g.) was stirred at room temperature for 72 hours. Vapor phase chromatographic analysis, which is employed here and in all subsequent examples, showed the presence of $4.92 \times 10^{-3}$ mole of adipimide. This meant an ε-caprolactam conversion of 7.0 percent and the efficiency of adipimide based upon caprolactam was 70.3 percent.

EXAMPLE 2

5G. of ε-caprolactam, 68.2 percent by weight of t-butyl hydroperoxide (5 g.), and vanadium oxyacetylacetonate (0.1 g.) were stirred at room temperature for 64 hours. Analysis disclosed that quantities of adipimide had been formed.

EXAMPLE 3

The same components and reaction conditions as in example 2 were used except that chromium (III) acetylacetonate was used as the catalyst. Adipimide had been formed at the end of this time.

EXAMPLE 4

The same reactants and reaction conditions as set forth in example 2 were used except that cuprous acetate was employed as the catalyst. Analysis at the end of this time showed the formation of adipimide.

EXAMPLE 5

Other than the substitution of cerium stannate as the catalyst, the reaction of example 2 was performed again. Adipimide was formed at the end of the 64-hour period in small amounts.

EXAMPLE 6

Example 2 was again conducted with the substitution of ferric acetylacetonate as the catalyst. Adipimide was formed at the end of 64 hours.

EXAMPLE 7

Dicyclopentadienyl-titanium dichloride was employed as the catalyst while the rest of the example was run according to example 2. Analysis revealed that adipimide had been formed.

EXAMPLE 8

A solution of 2-piperidone (95 g., 0.96 mole) and 68.8 percent t-butyl hydroperoxide was formed and stirred while manganic acetylacetonate (1.0 g.) was added thereto. Stirring was continued at room temperature for 96 hours. Analysis indicated the presence of 0.299 mole of glutarimide. The efficiency to glutarimide based upon 2-piperidone was 79.2 percent.

EXAMPLE 9

A solution of N-methyl-2-pyrrolidone (24.7 g., 0.25 mole), 69 percent by weight t-butyl hydroperoxide (62.5 g., containing 0.50 mole hydroperoxide), and manganic acetylacetonate (0.5 g.) was stirred together at room temperature for seven days. At the end of this time, analysis showed 0.067 mole of N-methyl succinimide. The efficiency to N-methyl succinimide based upon N-methyl-2-pyrrolidone was 35.4 percent.

This example is important for its showing that an N-H group is not mandatory for the oxidation to take place. The attack must occur directly on the methylene adjacent to the amido nitrogen.

Additional working examples are set forth in table I. Examples 11 and 18 indicate that the most preferred range for the peroxide/lactam mole ratio is 1 to 0.1, while a comparison between examples 13 and 17 shows that there may be a slight advantage to the use of air or oxygen in the reaction.

In all of the examples, the imides can be isolated from the rest of the lactam oxidation solution using fractional distillation.

While the working examples have been limited to oxidation of ε-caprolactam, 2-piperodone, 2-pyrrolidone and N-methyl-2-pyrrolidone, it is obvious that the reaction can readily be extended to the other compounds disclosed as long as there is at least one unsubstituted methylene group adjacent to the ring nitrogen of the compound.

What is claimed is:

1. A method for the production of cyclic imides comprising admixing in the liquid phase a lactam selected from the group consisting of pyrrolidones, piperidones, and epsilon-caprolactams wherein the ring moiety has a methylene group adjacent to the ring nitrogen with an organic hydroperoxide at a temperature of about -30° C. to about 120° C. in the presence of a

TABLE I.—OXIDATION OF LACTAMS

| Example | Lactam | Metal catalyst | t-BuOOH[a]/ lactam, mole ratio | t-BuOOH/ metal, mole ratio | Special conditions | Reaction time, hrs. | Conversion lactam, percent | Efficiency to imide based on lactam, percent |
|---|---|---|---|---|---|---|---|---|
| 10 | Caprolactam | Co(Naph)$_2$[b] | 1.03 | 182 | None | 64 | 21.8 | 23.7 |
| 11 | do | Mn(AcAc)$_3$[c] | 1.03 | 182 | None | 64 | 20.6 | 80.5 |
| 12 | do | Mn(AcAc)$_3$ | 1.13 | 357 | None | 144 | 23.9 | 76.8 |
| 13 | do | Mn(AcAc)$_3$ | 1.35 | 200 | N$_2$ Ebullition | 72 | 16.6 | 67.4 |
| 14 | do | Mn(AcAc)$_3$ | 1.13 | 200 | None | 136 | 28.6 | 78.0 |
| 15 | do | Mn(AcAc)$_2$[d] | 1.13 | 200 | None | 136 | 38.7 | 44.5 |
| 16 | do | Co(Naph)$_2$ | 1.13 | 200 | None | 136 | 21.2 | 44.6 |
| 17 | do | Mn(AcAc)$_3$ | 1.31 | 200 | O$_2$ Ebullition | 72 | 40.0 | 75.2 |
| 18 | do | Mn(AcAc)$_3$ | 2.03 | 355 | Synthesis Scale | 96 | 18.5 | 84.5 |
| 19 | 2-pyrrolidone | Mn(AcAc)$_3$ | 1.71 | 964 | None | 92 | 10.8 | 99.2 |

[a] t-Butyl hydroperoxide.
[b] Cobalt (II) naphthenate.
[c] Manganese (III) acetylacetonate.
[d] Manganese (II) acetylacetonate.

metal ion catalyst selected from the group consisting of Group 4A, 5A, 6A, 7A, 8 and 1B metals.

2. The method according to claim 1 wherein said hydroperoxide is a tertiary hydroperoxide.

3. The method according to claim 13 wherein said method is conducted in an oxygen enriched atmosphere.

4. The method according to claim 1 wherein said metal ion catalyst is a group 7A metal.

5. The method according to claim 1 wherein said metal ion catalyst is a group 8 metal.

6. The method according to claim 1 wherein said hydroperoxide is t-butyl hydroperoxide.

7. The method according to claim 1 wherein said lactam is ε-caprolactam.

8. The method according to claim 1 wherein said lactam is 2-piperidone.

9. The method according to claim 1 wherein said lactam is 2-pyrrolidone.

10. The method according to claim 6 wherein said metal ion catalyst is manganic acetylacetonate.

11. The method according to claim 10 wherein said lactam is ε-caprolactam.

* * * * *

UNITED STATES PATENT OFFICE
CERTIFICATE OF CORRECTION

Patent No. 3,621,012                    Dated Nov. 16, 1971

Inventor(s) P.S. Starcher et al.

It is certified that error appears in the above-identified patent and that said Letters Patent are hereby corrected as shown below:

Column 1, lines 59 and 60, column 3, lines 2 and 3, claim 1, line 8, and claim 4, line 2, change "A" to --B--, all occurrences.

Signed and sealed this 30th day of May 1972.

(SEAL)
Attest:

EDWARD M. FLETCHER, JR.　　　　　ROBERT GOTTSCHALK
Attesting Officer　　　　　　　　Commissioner of Patents